United States Patent
Rasmussen et al.

(10) Patent No.: US 10,447,084 B2
(45) Date of Patent: Oct. 15, 2019

(54) WIRELESS CHARGING MAT WITH DYNAMIC SURFACE TEXTURE

(71) Applicant: Apple Inc., Cupertino, CA (US)

(72) Inventors: Timothy J. Rasmussen, San Jose, CA (US); Eric S. Jol, San Jose, CA (US); Paul J. Thompson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 15/909,818

(22) Filed: Mar. 1, 2018

(65) Prior Publication Data

US 2019/0081509 A1    Mar. 14, 2019

Related U.S. Application Data

(60) Provisional application No. 62/556,173, filed on Sep. 8, 2017.

(51) Int. Cl.
*H02J 50/10* (2016.01)
*H02J 7/02* (2016.01)
*H02J 7/00* (2006.01)
*A47G 27/02* (2006.01)

(52) U.S. Cl.
CPC ............ *H02J 50/10* (2016.02); *H02J 7/0042* (2013.01); *H02J 7/025* (2013.01); *A47G 27/0243* (2013.01); *A47G 27/0275* (2013.01); *H02J 7/0044* (2013.01)

(58) Field of Classification Search
CPC .......... H02J 50/10; H02J 7/025; H02J 7/0042; H02J 7/0044; A47G 27/0243; A47G 27/0275

USPC ......................................................... 320/108
See application file for complete search history.

(56) References Cited

U.S. PATENT DOCUMENTS

| | | | |
|---|---|---|---|
| 10,277,043 B2 * | 4/2019 | Graham | H02J 50/10 |
| 2012/0049991 A1 * | 3/2012 | Baarman | H01F 17/0013 |
| | | | 336/199 |
| 2012/0313577 A1 * | 12/2012 | Moes | H02J 7/025 |
| | | | 320/108 |
| 2013/0293025 A1 * | 11/2013 | Xu | H02J 17/00 |
| | | | 307/104 |
| 2013/0297844 A1 | 11/2013 | Rosenberg et al. | |
| 2015/0280450 A1 * | 10/2015 | Park | H02J 7/025 |
| | | | 307/104 |
| 2016/0072334 A1 * | 3/2016 | Wu | H02J 50/90 |
| | | | 320/108 |

(Continued)

FOREIGN PATENT DOCUMENTS

| | | |
|---|---|---|
| EP | 3062492 A1 | 8/2016 |
| KR | 20140133164 A | 11/2014 |
| WO | 2015077239 A1 | 5/2015 |

OTHER PUBLICATIONS

PCT/US2018/048913, "International Search Report and Written Opinion", dated Nov. 23, 2018, 15 pages.

*Primary Examiner* — M Baye Diao
(74) *Attorney, Agent, or Firm* — Kilpatrick Townsend & Stockton LLP (57) ABSTRACT

A wireless charging mat has a surface area for receiving an electronic device to be charged. The surface area of the charging mat includes an inner region having a rough surface texture and an outer region having s smooth surface texture, and the outer region is elevated relative to the inner region.

13 Claims, 7 Drawing Sheets

(56) References Cited

U.S. PATENT DOCUMENTS

2017/0117738 A1* 4/2017 Yeoh .................. H02J 7/025
2019/0081517 A1* 3/2019 Graham ............... H02J 50/60

* cited by examiner

WIRELESS CHARGING MAT WITH DYNAMIC SURFACE TEXTURE

CROSS-REFERENCES TO RELATED APPLICATIONS

This claims the benefit of U.S. provisional patent application No. 62/556,173, filed Sep. 8, 2017, which is incorporated by reference.

BACKGROUND

Wireless charging devices have been developed to wirelessly charge electronic devices without the need for a charging cord. For example, some electronic devices can be recharged by merely resting the electronic device on a charging surface of a wireless charging device. A transmitter coil disposed below the charging surface may produce a time-varying magnetic field that induces a current in a corresponding receiving coil in the electronic device. The induced current can be used by the electronic device to charge its internal battery.

Inductive charge mats can experience a problem where electronic devices, such as mobile phones, slip off the surface of the mat due to the smooth surface of the phone and the mat. A charging mat with an uncoated silicone surface can prevent phone slippage, but silicone has poor esthetic and haptic qualities, and causes lint and dust to build up on the surface.

SUMMARY

In accordance with some embodiments of the disclosure, a wireless charging mat has a surface area for receiving an electronic device to be charged. The surface area of the charging mat includes an inner region having a rough surface texture and an outer region having s smooth surface texture, and the outer region is elevated relative to the inner region.

In some variations, the surface of the outer region has a higher coefficient of friction than the surface of the inner region.

In other variations, the surface area further includes a transition region between the inner region and the outer region, and the transition region has a surface texture gradient that continuously changes from the rough surface texture of the inner region to the smooth surface texture of the outer region.

In still other variations, the surface area further includes a transition region that continuously increases in height from the surface of the inner region to the elevated surface of the outer region.

In accordance with other embodiments of the disclosure, the surface area of the charging mat has a rough texture with friction bumps dispersed therein. The friction bumps have a smooth surface texture and form less than 20% of the surface area.

In accordance with other embodiments, the surface area of the charging mat includes a first region with an asymmetrical surface texture geometry oriented so as to promote movement of an overlying electronic device toward the center of the mat.

In accordance with other embodiments, the surface area of the charging mat has a texture defined by long protrusions spaced apart from one another such that when an electronic device is placed on the mat's surface, the long protrusions fold over to touch adjacent protrusions, and the electronic device comes in contact with side surfaces of the folded protrusions.

DETAILED DESCRIPTION

Some embodiments of the disclosure include a wireless charging mat having a dynamically changing surface texture such that a surface area of the mat has a grippy, smooth-texture outer region but a rough-texture inner region. To achieve this, in some embodiments, the surface texture of the outer region is engineered to have a higher coefficient of friction than that of the inner region. This may be accompanied by a surface geometry change whereby the outer region is elevated relative to the inner region to ensure an electronic device, such as a mobile phone, that is placed on the mat for charging makes contact with the grippy outer region. The grippy, raised outer region thus prevents an electronic device, such as a mobile phone, that is placed on the mat for charging from slipping off the mat.

A charging mat would optimally have positional freedom so that an electronic device, such as a phone, can be placed anywhere on the mat and be able to charge. It also may be a goal to design the charging mat to have a perfectly flat top surface for improved esthetic and haptic qualities, and with no limitations as to where on the mat a user can place the electronic device for charging. One issue with a perfectly flat surface is that an electronic device, e.g., a phone, with a low resistivity coating, such as oleophobic coating, on its backside, may slip off the mat even at extremely low angles. For example, one degree incline may cause the phone to slip off the mat.

It has been observed that silicone, which may be used as a core material for surface texture, has a significant influence on the slippage performance and the coefficient of friction. While silicone has a smooth surface, and thus grips well, it is not esthetically nor haptically pleasing. Also, data obtained by the inventors shows that the traditional methods of measuring coefficient of friction do not track well to slippage performance. This is because the issue at hand relates to very slow slip rates that over an extended period of time may cause the electronic device to slip off the mat (e.g., a phone placed on a charge mat for charging overnight). In this disclosure, various techniques for controlling the surface texture so as to prevent such slippage while maintaining a substantially flat surface that feels good to the touch, is esthetically pleasing, and doesn't attract lint or dust are described.

Figure 1A:
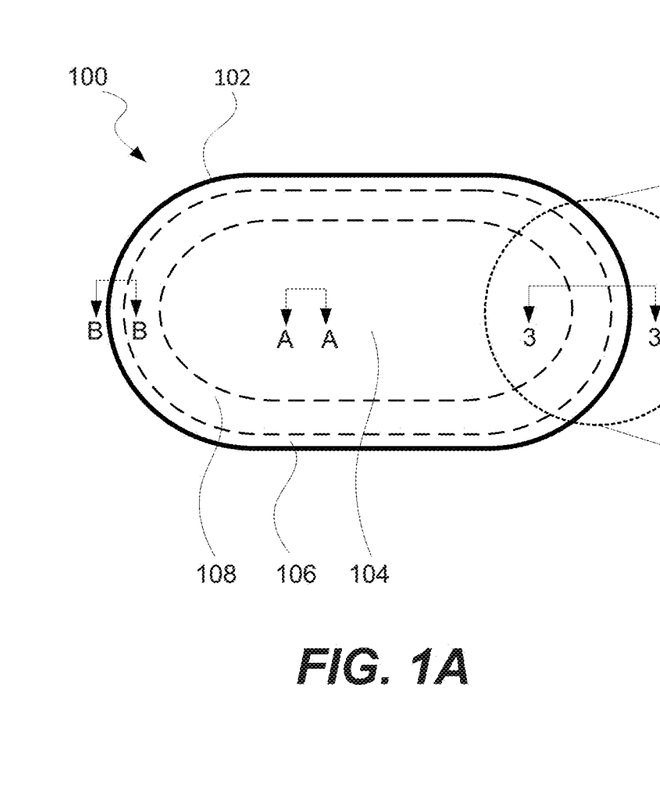
FIG. 1A is a top view of a wireless charging mat, according to an embodiment of the present disclosure.
Figure 1B:
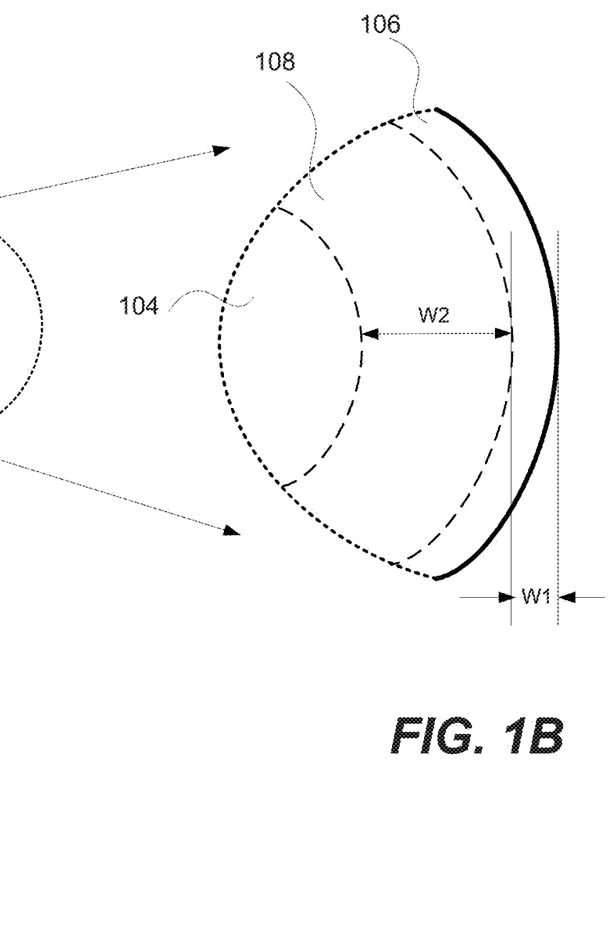
FIG. 1B is a magnified view of a portion of the wireless charging mat in FIG. 1A.
Figure 2A:
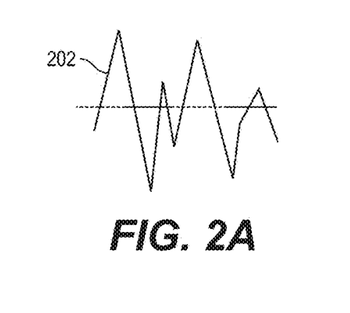
FIGS. 2A and 2B show exemplary roughness profiles along lines A-A and B-B in FIG. 1A, respectively.
Figure 2B:
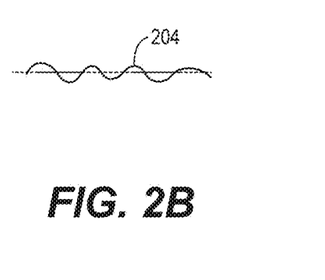

A first technique whereby dynamic surface texturing is used will be described with reference to FIGS. 1A-1B, 2A-2B, and 3-5. FIG. 1A is a top view of charging mat 100. Charging mat 100 includes a charging area delineated by the outer boundary line 102. Charging area 102 includes high Ra texture inner region 104 and low Ra texture outer region 106 separated by transition region 108. High Ra texture inner region 104 has a low coefficient of friction so as to provide good haptics. Low Ra texture outer region 106 has a high coefficient of friction and is thus grippy. Transition region 108 may have a continuous texture gradient that changes from the high Ra texture of inner region 104 to the low Ra texture of outer region 106. These three regions are more clearly delineated in FIG. 1B which shows a magnified view of a portion of mat 100. FIGS. 2A-2B show exemplary roughness profiles along line A-A in inner region 104 and along line B-B in outer region 106 in FIG. 1A, respectively. The roughness profiles in FIGS. 2A-2B reflect a high Ra (rough) texture 202 in inner region 104 and a low Ra (smooth) texture 204 in outer region 106, respectively.

Figure 3:
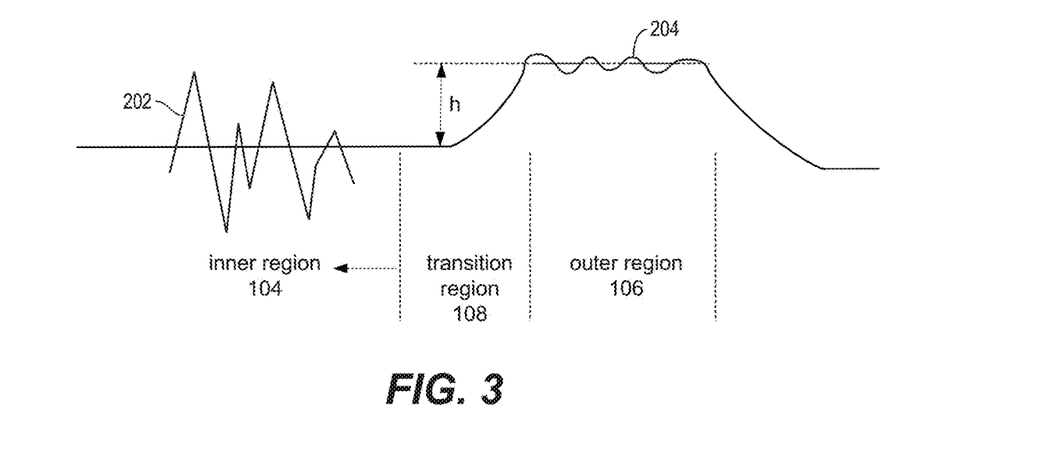
FIG. 3 shows a cross section view along line 3-3 in FIG. 1A.

As can be seen from FIGS. 2A-2B, for a perfectly even mat surface, the peaks of rough surface texture 202 in inner region 104 are much higher than the peaks of smooth surface texture 204 in outer region 106. Thus, when an electronic device is placed on mat 100, the high peaks of the rough texture of inner region 104 may prevent the electronic device from contacting outer region 106, thus defeating the purpose of the smooth, grippy outer region 106. To ensure that the electronic device makes contact with outer region 106, outer region 106 may be slightly elevated relative to inner region 104. This is illustrated in FIG. 3 which shows a cross section view along line 3-3 in FIG. 1A at an outer perimeter area of mat 100. The various dimensions in FIG. 3 are exaggerated to illustrate the purpose for elevating outer region 106. In FIG. 3, inner region 104 with rough surface texture 202, transition region 108, and outer region 106 with smooth surface texture 204 are marked. While transition region 108 is shown in FIG. 3 as having no surface texture, it is to be understood that, as noted above, this region may have a continuous texture gradient that gradually changes from the rough surface texture 202 of inner region 104 to the smooth surface texture 204 of outer region 106. As shown in FIG. 3, outer region 106 is elevated relative to inner region 104 by a height "h" that corresponds to or is greater than the Ra value of the rough surface texture 202 in inner region 104. Ideally, height h is tall enough to ensure that an electronic device that is placed on the mat makes contact with the smooth, grippy outer region 106 if slippage occurs, yet is slight enough so that the raised outer region 106 would not be visually and/or haptically perceptible.

Figure 4:
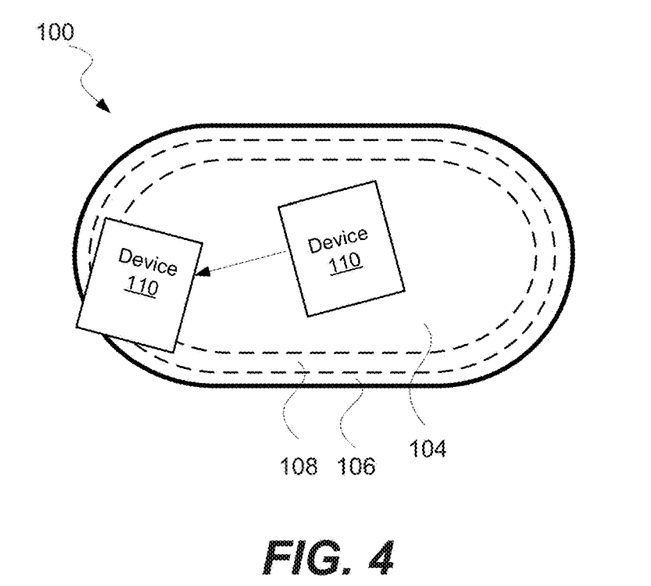
FIG. 4 illustrates the outer region of the charging mat in FIG. 1A keeping an electronic device, such as a mobile phone, from slipping off the charging mat.

With the above technique, an electronic device placed on wireless charging mat 100 is advantageously prevented from slipping off the mat. This is illustrated in FIG. 4 where electronic device 110 (e.g., a mobile phone) is shown to be placed in inner region 104 of wireless charging mat 100. In this example, electronic device 110 is shown to slip to the left, for example, while being charged overnight. However, as electronic device 110 overlaps transition region 108 and starts to overlap the grippy out region 106, electronic device 110 stops slipping, and thus charging of device 110 continues uninterrupted.

In some embodiments, width W1 (FIG. 1B) of outer region 106 is in the range of 2 mm to 5 mm, width W2 (FIG. 1B) of transition region 108 is in the range of 2 mm to 15 mm, and the height h (FIG. 3) of the raised outer region 106 is in the range of 20 µm to 100 µm. The specific values selected for the various dimensions depend on different factors. For example, in some embodiments, it may be desirable to keep the smooth texture outer region 106 as small as possible to minimize its impact on esthetics and haptic performance, but large enough to prevent an electronic device from slipping off the mat, or width W2 of transition region 108 may be varied depending on various design and manufacturing factors.

In some embodiments, charging mat 100 may be designed to accommodate charging more than one electronic device at a time. In such embodiments, charging area 102 (FIG. 1A) may be made large enough to accommodate multiple electronic devices. Alternatively, the charging mat may be designed to have two or more discrete surface areas each designated to receive one electronic device for charging. Each discrete surface area may be designed to have an inner region, an outer region and a transition region, similar to that shown in FIGS. 1A-1B, 2A-2B and 3-5. While FIG. 1A shows outer region 106 and intermediate region 108 to extend around the entire perimeter of mat 100, in other embodiments, these regions may extend along only two opposing sides of the mat, or may extend intermittently along the perimeter of the mat. Also, while the mats shown and described herein are oval in shape, the various techniques described herein are not limited to oval shaped mats. The disclosed techniques may be implemented in mats with other shapes, such as, square, circular, rectangular and the like.

The dynamic surface texture illustrated by FIGS. 1A-1B, 2A-2B and 3-5 could be obtained using traditional texturing techniques (e.g., EDM, chemical etch, sand blasting) and masking local regions. However, these techniques may lead to discrete changes in surface texture and possible defects. In some embodiments, selective laser texturing is used so that the surface texture of the mat can be more precisely engineered as a function of position. For example, selective laser texturing may be used to obtain the continuous texture gradient in transition region 108. The raised outer region 106 may be obtained using different techniques. In one embodiment, a tool steel with a flat surface is used, and the inner region of the tool steel is textured with peaks and valleys, where the valleys coincide with the surface of the starting tool steel. Laser is used to cut the smooth surface. The outer smooth surface would be proud of the inner rough texture. In an alternate technique, a steel concave that slopes down very slightly from out to in may be used. The slope would not be perceptible, but enough so that the peaks of the rough inner texture will be below the outer smooth surface.

Figure 5:
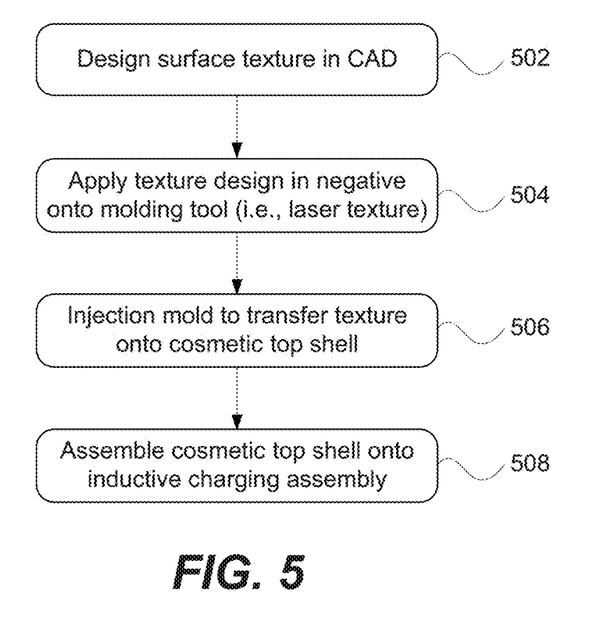
FIG. 5 is a flow chart for a method of forming the cosmetic top shell of the wireless charging mat in FIG. 1A.

FIG. 5 is a flow chart illustrating a process flow for forming the cosmetic top shell of wireless charging mat 100, according to some embodiments. At step 502, the desired surface texture for the cosmetic top shell is designed using CAD. At step 504, using laser texture technique, the texture design in negative is applied onto molding tool. At step 506, injection molding is used to transfer the texture onto the cosmetic top shell of the mat. At step 508, the cosmetic top shell is assembled onto the inductive charging assembly.

In accordance with other embodiments, an additive process such as a coating process is used in forming the cosmetic top shell of a wireless charging mat. Particles are added on a substrate, such as, a molded silicone substrate. These particles may also be referred to as matting agent since they serve to make the surface more matte. A thin coating layer, such as a thin layer of silicone, is then formed over the substrate surface and the particles. The particles give the top surface of the substrate the soft touch properties, and the coating layer serves to bond the particles to the substrate. The size, the number and the type of the particles are selected to achieve the target coefficient of friction that would be effective in preventing slippage of a target electronic device (e.g., a target cell phone), and to achieve the desired esthetic and haptic performance. The particles may be hard particles such as silica particles, or may be other types of particles such as fluoropolymers and general elastomers, or may be a mix of different types of particles.

Selecting the size and quantity of the particles involves a tradeoff between the haptic feel and the surface roughness. For example, decreasing the size and quantity of the particles results in a more flat surface which in turn yields a higher coefficient of friction so that the mat surface is more grippy. However, this results in worse haptics.

Another parameter considered is the elastic modulus of both the particles and the coating layer. Stiffness of the particles and the coating layer controls how much an overlying electronic device such as a cell phone sinks into the particles and the coating layer. In some embodiments, silica, which is extremely hard with very high durometer is used as the particles, while in other embodiments, elastomers which can have durometers as low as 20 Shore A may be used as the particles. In some embodiments, a combination of different types of particles are used. The type and size of particles used depends on the target electronic device and the target performance of the mat. For example, in order to obtain a coefficient of friction needed to prevent slippage of a particular cell phone with a particular coating on the cell phone surface, hard particles such as silica may work best. This would achieve the coefficient of friction needed to prevent the cell phone from slipping. For another cell phone with a different coating on its surface, elastomer particles may provide the needed coefficient of friction while providing excellent haptics.

Another parameter considered is the ratio of the coating layer to the particles, by volume, for a given thickness of the coating layer. In one example where a coating layer with a thickness of 10 μm is used, a ratio of the coating layer to the particles, by volume, of 10 to 1 is used. There are tradeoffs as a thicker or thinner coating layer is used. A thicker coating layer may provide better reliability while a thinner coating layer may allow better control of the coefficient of friction and gloss level. The ratio of the coating layer to the particles, by volume, impacts the percentage of the surface that is occupied by the particles, and thus impacts the coefficient of friction and the haptic performance of the mat. Other process parameters such as the temperature and duration of the curing and how wet or dry the spray process for forming the coating layer may be are well known and thus will not be discussed here.

The above coating process may be modified in a variety of ways to achieve the target design. For example, for mat 100 in embodiments illustrated in FIGS. 1A-1B, 2A-2B and 3-5, the entire surface of the mat, including the inner and the outer regions, may receive the particles and the coating layer. Alternatively, a masking process may be used to ensure that only the outer region receives the particles and the coating layer while the inner region remains free of the particles. In still other embodiments, the entire surface of the mat may receive the particles and the coating layer, however, a masking process may be used to form a different quantity and/or size of particles or different types of particles in the inner region than in the outer region. Depending on the target electronic device and the general design goals, any one or combination of the above alternatives may be used. For example, variations of the above coating processes may be used in forming the surface textures in other embodiments described below.

Rough Surface with Distributed Friction Bumps

Figure 6A:
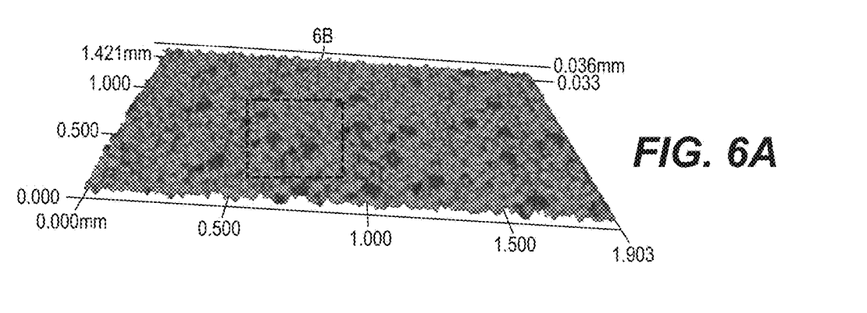
FIGS. 6A and 6B show perspective views and FIG. 6C shows a cross section view of a surface of a wireless charging mat where friction bumps are dispersed along an otherwise rough surface of the charging mat.
Figure 6B:
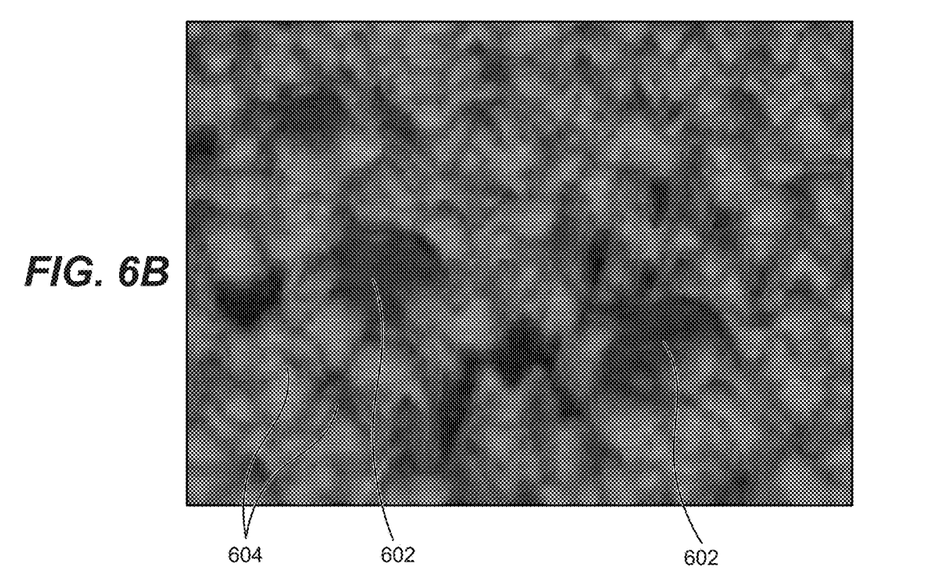
Figure 6C:
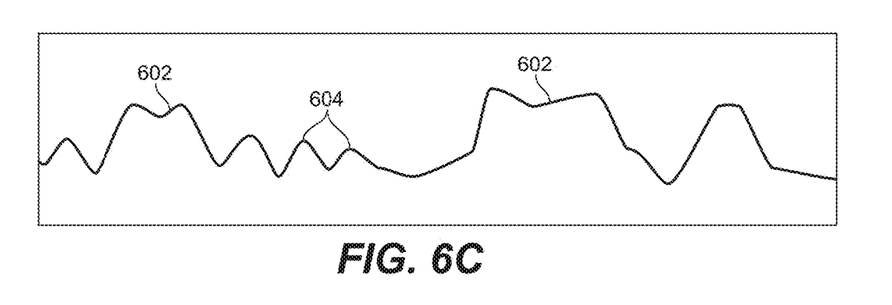

Another dynamic texturing technique is illustrated in FIGS. 6A-6C. FIG. 6A is a computer generated 3 dimensional color scale of the texture along the surface of the wireless charging mat. FIG. 6B is a magnified view of region 6B in the 3-D image in FIG. 6A. FIG. 6C is a cross section view along the textured surface in FIG. 6A. As can be seen in FIGS. 6A-6C, friction bumps 602 with smooth surfaces are distributed randomly along the otherwise rough texture surface of the charging mat. The rough texture in the rough texture surface areas of the mat have peaks 604. Thus, the rough texture surface areas and smooth texture surface areas (i.e., the plateaus of friction bumps 602) are intermingled as opposed to being separately-defined regions as in the embodiments described with reference to FIGS. 1A-1B, 2A-2B and 3-5. Friction bumps 602 have a smooth texture surface along their plateau, and the plateaus of the friction bumps may be higher than rough texture peaks 604 in the rough texture surface areas. This can be more clearly seen in FIG. 6C which shows the elevation of friction bumps 602 and peaks 604 in the rough texture surface areas. The higher plateaus of friction bumps 602 ensure that an electronic device placed on the charging mat contacts the grippy surface of friction bumps 602. Laser process can be used in forming friction bumps 602. While FIG. 6A shows friction bumps 602 being randomly distributed in the otherwise rough texture surface of the mat, surface bumps 602 may be incorporated in the rough texture surface in a pre-designated pattern.

To ensure that the charging mat is sufficiently grippy, a minimum number of friction bumps 602 needs to be included along the mat surface, and friction bumps 602 must have a substantially smooth top surface. In some embodiments, the friction bumps account for about 5% to 20% of the total surface area of the mat, and have a height in the range of 20 μm to 30 μm. The top surface of the friction bumps may have a roughness (Ra) of less than 0.2 μm. As with the embodiments illustrated in FIGS. 1A-1B, 2A-2B and 3-5, the specific values selected for the various dimensions depend on different factors. For example, it is desirable to keep the percentage of the surface area covered by friction bumps 602 as low as possible in order to minimize the impact of the friction bumps on the esthetic and haptic performance of the mat, but high enough to provide sufficient stickiness to ensure an electronic device that is placed on the mat does not slip off the mat.

Directional Asymmetric Texture

Figure 7:
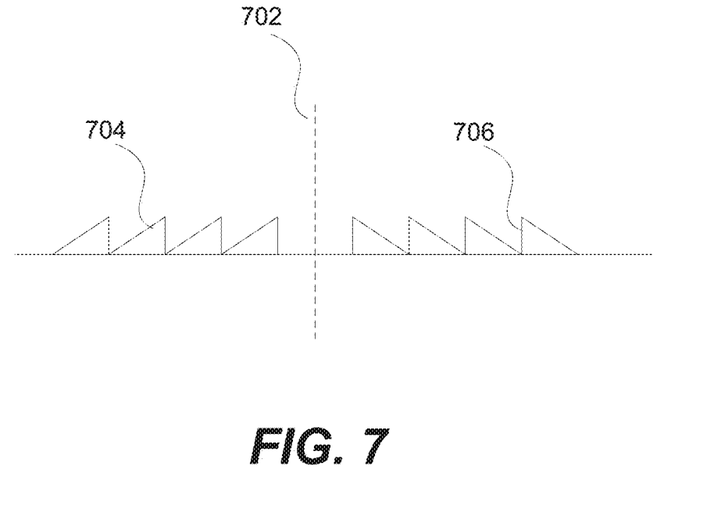
FIG. 7 shows an asymmetrical surface texture of a charging mat that is symmetrical about the mat center line, according to another embodiment of the present disclosure.

According to other embodiments, the surface texture of the charging mat is engineered so as to promote an electronic device that is placed on the mat to move toward the center of the mat, thus preventing the electronic device from slipping off the mat. FIG. 7 shows a surface texture of a charging mat that is symmetrical about the mat center line 702, according to one embodiment. Surface texture 704 on the left side of center line 702 is engineered to have an asymmetrical geometry so as to promote an electronic device that is placed on the mat to move to the right, toward the mat center. Similarly, surface texture 706 on the right side of center line 702 has an asymmetrical geometry, however, asymmetrical texture 706 is oriented so that it promotes movement of the electronic device to the left, toward the mat center. This configuration encourages an electronic device placed on the mat to slip towards the center of the mat, thus preventing the electronic device from slipping off the mat. The surface texture shown in FIG. 7 can be obtained using laser texturing process.

Figure 8A:
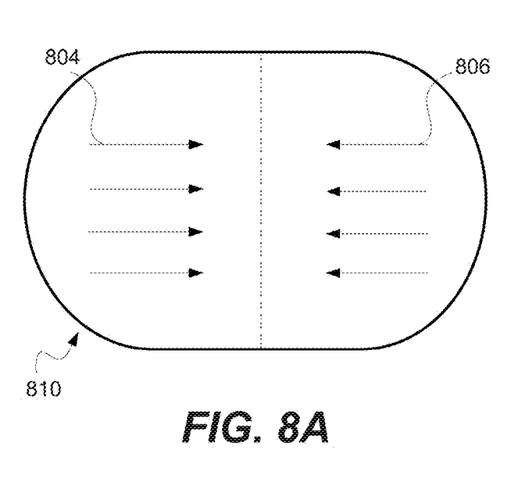
FIGS. 8A-8C show various embodiments of the technique disclosed with reference to FIG. 7.
Figure 8B:
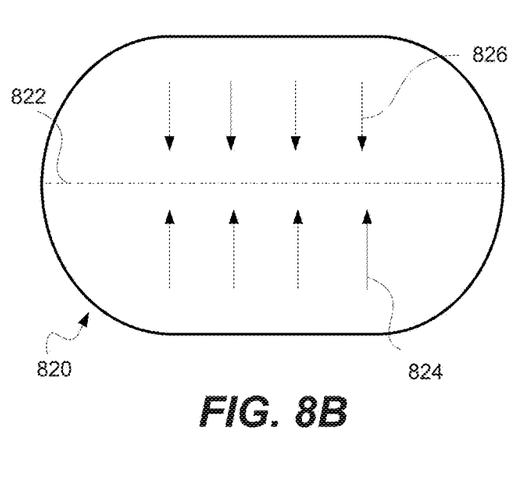
Figure 8C:
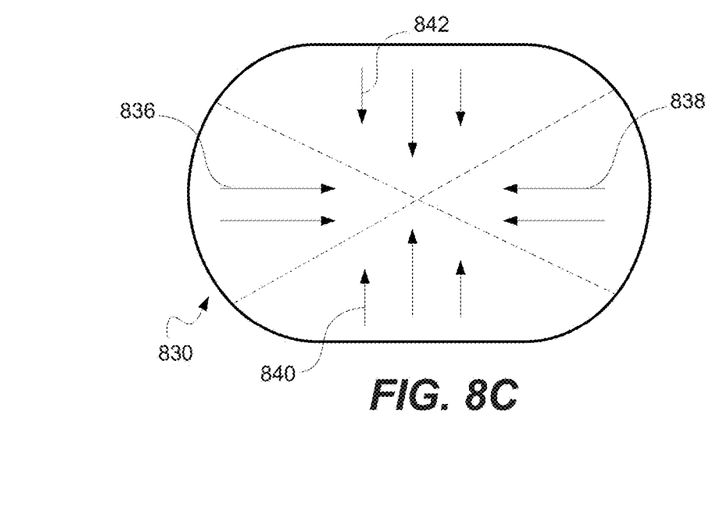

In some embodiments, surface texture 704 on the left side of mat center line 702 in FIG. 7 may be formed along the entire left half surface of the charging mat, while surface texture 706 shown on the right side of mat center line 702 may be formed along the entire right half surface of the charging mat. This is illustrated in FIG. 8A where arrows 804 and 806 on mat 810 show the direction of movement that the surface texture along each of the left half and the right half of the mat surface promote. Alternatively, as shown by arrows 824 and 826 in FIG. 8B, the surface texture of mat 820 can be engineered so that the surface texture along the upper half of mat 820 promotes movement toward center line 822 of mat 820, while the surface texture along the lower half of mat 820 promotes movement toward center line 822 of mat 820. In still another variation shown in FIG. 8C, the surface texture of mat 830 may be oriented in 4 different directions so that each of a right region, a left region, a top region, and a bottom region of the mat surface promotes movement toward the center of the mat, as illustrated by arrows 836, 838, 840 and 842.

In still other embodiments, the frequency and/or size of the texture geometry may be varied across the surface of the charging mat. For example, in regions of the mat surface farther from the center, the texture geometry may be shaped to have a steeper slope than those closer to the center of the mat, so that the outer regions more highly promote movement toward the center than the inner regions. It is noted that the above-described techniques are not limited to the triangular-shaped texture geometry shown in FIG. 7. Any texture geometry that promotes movement in a desired direction may be used. Accordingly, other segmentations of the mat and texture orientations and geometries for promoting movement toward the center of the mat may be envisioned by one skilled in the art in view of this disclosure.

Surface Texture with Long Protrusions

Figure 9:
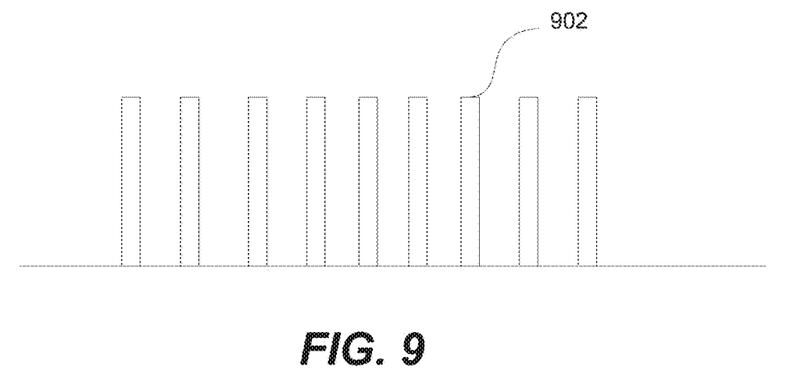
FIG. 9 shows a surface texture of a charging mat that includes long protrusions extending from the mat surface, according to yet another embodiment of the present disclosure.

According to yet other embodiments illustrated in FIG. 9, the surface texture of the charging mat is engineered to have long protrusions 902, for example, of silicone, extending up from the surface. The ratio of the width to length of each protrusion 902 may be relatively low. When an electronic device, such as a phone, is placed on the mat for charging, long protrusions 902 are weighed down, causing them to fold over. The folded protrusions cover the gaps between adjacent protrusions, and form large contact surface areas. As such, the electronic device makes contact with the sides of the folded protrusions. In some embodiments, protrusions 902 may have a height to diameter (or width) ratio in the range of 10:1 to 2.5:1. In some embodiments, protrusions 902 may have a height in the range of 50 μm to 100 μm, and a diameter (or width) in the range of 10 μm to 20 μm. The spacing between adjacent protrusions may be optimized so that they are not so close to one another to prevent the protrusions from moving relative to one other, and not so far apart that adjacent protrusions do not touch each other when an electronic device weighs down on the protrusions. Protrusions 902 may have any desired shape, such as, circular, square or rectangular, along its cross-section. Hyper-elastic material, such as silicone, that is able to hinge and elastically deform may be used to form the texture shown in FIG. 9.

A number of surface texturing techniques for preventing slippage of an electronic device off of a wireless charging mat are described above. Various aspect(s) of these techniques may be combined to obtain improved performance and/or manufacturability. Although the invention has been described with respect to specific embodiments, it will be appreciated that the invention is intended to cover all modifications and equivalents within the scope of the following claims.

What is claimed is:

1. A wireless charging mat comprising a surface area for receiving an electronic device to be charged, the surface area including an inner region and an outer region, the inner region having a rough surface texture and the outer region having a smooth surface texture, the outer region being elevated relative to the inner region; wherein the outer region is elevated relative to the inner region by a height h, the height h being equal to or greater than an Ra value of the rough surface texture of the inner region.

2. The wireless charging mat of claim 1, wherein the surface of the outer region has a higher coefficient of friction than the surface of the inner region.

3. The wireless charging mat of claim 1, wherein the surface area further includes a transition region between the inner region and the outer region, the transition region having a surface texture gradient that continuously changes from the rough surface texture of the inner region to the smooth surface texture of the outer region.

4. The wireless charging mat of claim 3 wherein a width of the transition region is in the range of 2 mm to 15 mm.

5. The wireless charging mat of claim 1, wherein the surface area further includes a transition region that continuously increases in height from the surface of the inner region to the elevated surface of the outer region.

6. The wireless charging of mat of claim 1 wherein the outer region is elevated relative to the inner region so as to ensure an electronic device placed on the wireless charging mat makes physical contact with the surface area in the outer region in the event the electronic device slips off the inner region and overlaps the outer region.

7. The wireless charging mat of claim 1 wherein the outer region is in the form an elevated strip extending along a perimeter of the charging mat.

8. The wireless charging mat of claim 1 wherein a width of the outer region is in the range of 2 mm to 5 mm.

9. The wireless charging mat of claim 1 wherein the outer region is elevated relative to the inner region by a height in the range of 20 μm to 100 μm.

10. A wireless charging mat comprising a surface area for receiving an electronic device to be charged, the surface area having a rough texture with friction bumps dispersed therein, the friction bumps having a smooth surface texture and forming less than 20% of the surface area; wherein the surfaces of the friction bumps form plateaus that are higher than the peaks of the rough texture.

11. The wireless charging mat of claim 10, wherein the regions of the surface area that do not have friction bumps have a lower coefficient of friction than a surface of the friction bumps.

12. A wireless charging mat comprising a surface area for receiving an electronic device to be charged, the surface area including a first region with an asymmetrical surface texture geometry oriented so as to promote movement of an overlying electronic device toward the center of the mat; wherein the surface area further includes a second region with an asymmetrical surface texture geometry oriented so as to promote movement of an overlying electronic device toward the center of the mat, the surface texture in the first region being symmetrical with respect to the surface texture in the second region.

13. The wireless charging mat of claim 12, wherein the asymmetrical surface texture geometry has a triangular shape.

\* \* \* \* \*